US012652545B2

(12) United States Patent
Indrieri et al.

(10) Patent No.: US 12,652,545 B2
(45) Date of Patent: Jun. 9, 2026

(54) MACHINE LEARNING-BASED SYSTEM AND METHOD FOR DETERMINING SERVICE COVERAGE AND PERFORMANCE SOLUTIONS WITH PRECISE LOCATION DEPLOYMENT

(71) Applicant: T-MOBILE INNOVATIONS LLC, Overland Park, KS (US)

(72) Inventors: Timothy Indrieri, San Ramon, CA (US); Gurpreet Singh, Manteca, CA (US); Aqeel Mohammed, Pleasant Hill, CA (US); Stephen Todd Vancleve, Walnut Creek, CA (US); Yong Bin Wu, Dublin, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 824 days.

(21) Appl. No.: 17/983,878

(22) Filed: Nov. 9, 2022

(65) Prior Publication Data

US 2024/0155362 A1     May 9, 2024

(51) Int. Cl.
*H04W 16/18* (2009.01)
(52) U.S. Cl.
CPC ................................... *H04W 16/18* (2013.01)
(58) Field of Classification Search
CPC ...................................................... H04W 16/18
See application file for complete search history.

(56) References Cited

U.S. PATENT DOCUMENTS

| | | | | |
|---|---|---|---|---|
| 6,952,181 B2 * | 10/2005 | Karr | ......................... | G01S 5/021 |
| | | | | 342/453 |
| 2006/0199548 A1 * | 9/2006 | Saraby | ................ | H04M 3/2236 |
| | | | | 455/67.13 |
| 2009/0143018 A1 * | 6/2009 | Anderson | ............... | G01S 5/021 |
| | | | | 455/67.11 |
| 2009/0290508 A1 * | 11/2009 | Puthenpura | ......... | H04L 12/2854 |
| | | | | 370/254 |
| 2012/0007775 A1 * | 1/2012 | Alizadeh-Shabdiz | ...................... | |
| | | | | G01S 5/0263 |
| | | | | 342/357.31 |
| 2013/0279354 A1 * | 10/2013 | Ekman | ................... | H04W 24/08 |
| | | | | 370/252 |

(Continued)

FOREIGN PATENT DOCUMENTS

| | | | | |
|---|---|---|---|---|
| CA | 1316217 C | * | 4/1993 | |
| CN | 106162544 B | * | 9/2019 | |

(Continued)

*Primary Examiner* — Yuwen Pan
*Assistant Examiner* — Swati Jain
(74) *Attorney, Agent, or Firm* — Shook, Hardy & Bacon LLP

(57) ABSTRACT

Aspects herein provide a system, media, and methods for/of an application that utilizes and leverages machine learning techniques, infrastructure information (e.g., existing and planned cell sites, lease agreement sites, fiber-optic networks, geographic landmarks), and collected telecommunication data, to accurately identify and determine specific solutions and specific locations for those solutions to be deployed in a geographic area. In embodiments, the application autonomously identifies an optimized specific solution type for various clusters of poor-service coverages areas within the geographic areas. The application also determines a precise location for deployment of each optimized specific solution type for each cluster.

20 Claims, 8 Drawing Sheets

(56) References Cited

U.S. PATENT DOCUMENTS

| | | | | |
|---|---|---|---|---|
| 2017/0272305 | A1* | 9/2017 | Lu | H04W 24/10 |
| 2018/0216459 | A1* | 8/2018 | Heikkila | E21C 41/26 |
| 2018/0348334 | A1* | 12/2018 | Millman | G01S 5/02527 |
| 2018/0352309 | A1* | 12/2018 | Hopcraft | H04L 41/145 |
| 2019/0087840 | A1* | 3/2019 | Zachariah | G06Q 30/0205 |
| 2019/0137621 | A1* | 5/2019 | Zhang | G01S 5/02523 |
| 2019/0219982 | A1* | 7/2019 | Klassen | G05B 19/406 |
| 2019/0258878 | A1* | 8/2019 | Koivisto | G05D 1/00 |
| 2020/0125780 | A1* | 4/2020 | Baeckler | G06F 30/394 |
| 2020/0229206 | A1* | 7/2020 | Badic | H04W 28/0226 |
| 2020/0287779 | A1* | 9/2020 | Zafer | H04L 41/0631 |
| 2022/0191118 | A1* | 6/2022 | Hague | H04L 41/02 |
| 2022/0405544 | A1* | 12/2022 | Alomoush | G06N 20/00 |
| 2023/0281071 | A1* | 9/2023 | Malboubi | G06F 11/079 |
| | | | | 714/37 |
| 2023/0298739 | A1* | 9/2023 | Williams | G16H 50/20 |
| | | | | 705/2 |
| 2023/0360547 | A1* | 11/2023 | Brockers | G06V 10/82 |
| 2024/0373246 | A1* | 11/2024 | Rathore | H04W 16/18 |

FOREIGN PATENT DOCUMENTS

| | | | | | |
|---|---|---|---|---|---|
| CN | 113301503 | A | * | 8/2021 | G06F 18/23 |
| CN | 113055988 | B | * | 6/2022 | G06F 18/2321 |

* cited by examiner

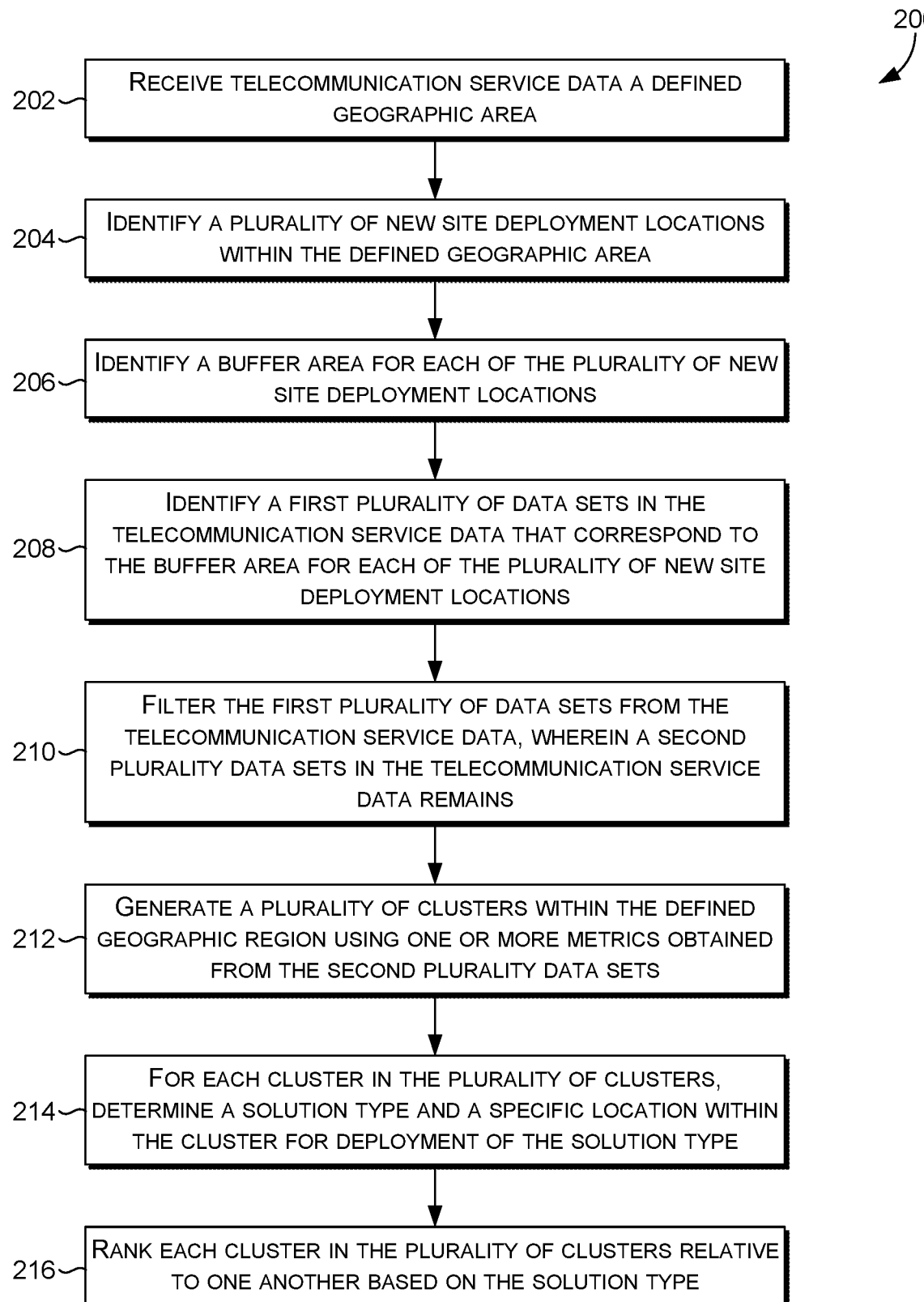

200

202 — RECEIVE TELECOMMUNICATION SERVICE DATA A DEFINED GEOGRAPHIC AREA

204 — IDENTIFY A PLURALITY OF NEW SITE DEPLOYMENT LOCATIONS WITHIN THE DEFINED GEOGRAPHIC AREA

206 — IDENTIFY A BUFFER AREA FOR EACH OF THE PLURALITY OF NEW SITE DEPLOYMENT LOCATIONS

208 — IDENTIFY A FIRST PLURALITY OF DATA SETS IN THE TELECOMMUNICATION SERVICE DATA THAT CORRESPOND TO THE BUFFER AREA FOR EACH OF THE PLURALITY OF NEW SITE DEPLOYMENT LOCATIONS

210 — FILTER THE FIRST PLURALITY OF DATA SETS FROM THE TELECOMMUNICATION SERVICE DATA, WHEREIN A SECOND PLURALITY DATA SETS IN THE TELECOMMUNICATION SERVICE DATA REMAINS

212 — GENERATE A PLURALITY OF CLUSTERS WITHIN THE DEFINED GEOGRAPHIC REGION USING ONE OR MORE METRICS OBTAINED FROM THE SECOND PLURALITY DATA SETS

214 — FOR EACH CLUSTER IN THE PLURALITY OF CLUSTERS, DETERMINE A SOLUTION TYPE AND A SPECIFIC LOCATION WITHIN THE CLUSTER FOR DEPLOYMENT OF THE SOLUTION TYPE

216 — RANK EACH CLUSTER IN THE PLURALITY OF CLUSTERS RELATIVE TO ONE ANOTHER BASED ON THE SOLUTION TYPE

FIG. 2

MACHINE LEARNING-BASED SYSTEM AND METHOD FOR DETERMINING SERVICE COVERAGE AND PERFORMANCE SOLUTIONS WITH PRECISE LOCATION DEPLOYMENT

TECHNICAL FIELD

The present disclosure generally relates to machine learning techniques that improve telecommunications service quality and coverage by autonomously identifying solutions and precise deployment locations.

SUMMARY

A high-level overview of various aspects of the invention are provided here for that reason, to provide an overview of the disclosure and to introduce a selection of concepts that are further described below in the Detailed Description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for an application that utilizes and leverages machine learning techniques, infrastructure information (e.g., existing and planned cell sites, lease agreement sites, fiber-optic networks, geographic landmarks), and collected telecommunication data, to accurately identify and determine specific solutions and specific locations for those solutions to be deployed in a geographic area.

In one aspect, a computerized method is provided. In accordance with the method, telecommunication service data is received for a defined geographic area. A plurality of new site deployment locations within the defined geographic area are identified. A buffer area is identified for each of the plurality of new site deployment locations. A first plurality of data sets is identified in the telecommunication service data that correspond to the buffer area for each of the plurality of new site deployment locations. The first plurality of data sets is filtered out from the telecommunication service data, wherein a second plurality of data sets in the telecommunication service data remains. A plurality of clusters within the defined geographic region are generated using one or more metrics obtained from the second plurality of data sets. For each cluster in the plurality of clusters, a solution type and a specific location within the cluster for deployment of the solution type are determined. Each cluster in the plurality of clusters is ranked relative to one another.

In another aspect, one or more non-transitory computer-readable media are provided for storing instructions that when executed via one or more processors performs a computerized method. Via one or more processors, and without user intervention, telecommunication service data is received for a defined geographic area. A plurality of new site deployment locations within the defined geographic area are identified. A buffer area is identified for each of the plurality of new site deployment locations. A first plurality of data sets is identified in the telecommunication service data that correspond to the buffer area for each of the plurality of new site deployment locations. The first plurality of data sets is filtered out from the telecommunication service data, wherein a second plurality of data sets in the telecommunication service data remains. A plurality of clusters within the defined geographic region are generated using one or more metrics obtained from the second plurality of data sets. For each cluster in the plurality of clusters, a solution type and a specific location within the cluster for deployment of the solution type are determined. Each cluster in the plurality of clusters is ranked relative to one another.

In yet another aspect, a system is provided. The system includes a database storing telecommunication service data for a defined geographic area and a telecommunication network communicatively coupled to the database. The system further includes one or more processors communicatively coupled to the telecommunication network that are configured to perform specific actions. Via one or more processors, telecommunication service data is received for a defined geographic area. A plurality of new site deployment locations within the defined geographic area are identified. A buffer area is identified for each of the plurality of new site deployment locations. A first plurality of data sets is identified in the telecommunication service data that correspond to the buffer area for each of the plurality of new site deployment locations. The first plurality of data sets is filtered out from the telecommunication service data, wherein a second plurality of data sets in the telecommunication service data remains. A plurality of clusters within the defined geographic region are generated using one or more metrics obtained from the second plurality of data sets. For each cluster in the plurality of clusters, a solution type and a specific location within the cluster for deployment of the solution type are determined. Each cluster in the plurality of clusters is ranked relative to one another.

BRIEF DESCRIPTION OF THE DRAWINGS

Aspects are described in detail below with reference to the attached drawings, wherein:

FIG. 2 illustrates a flowchart of an example method in accordance with one or more embodiments;

DETAILED DESCRIPTION

Figure 1:
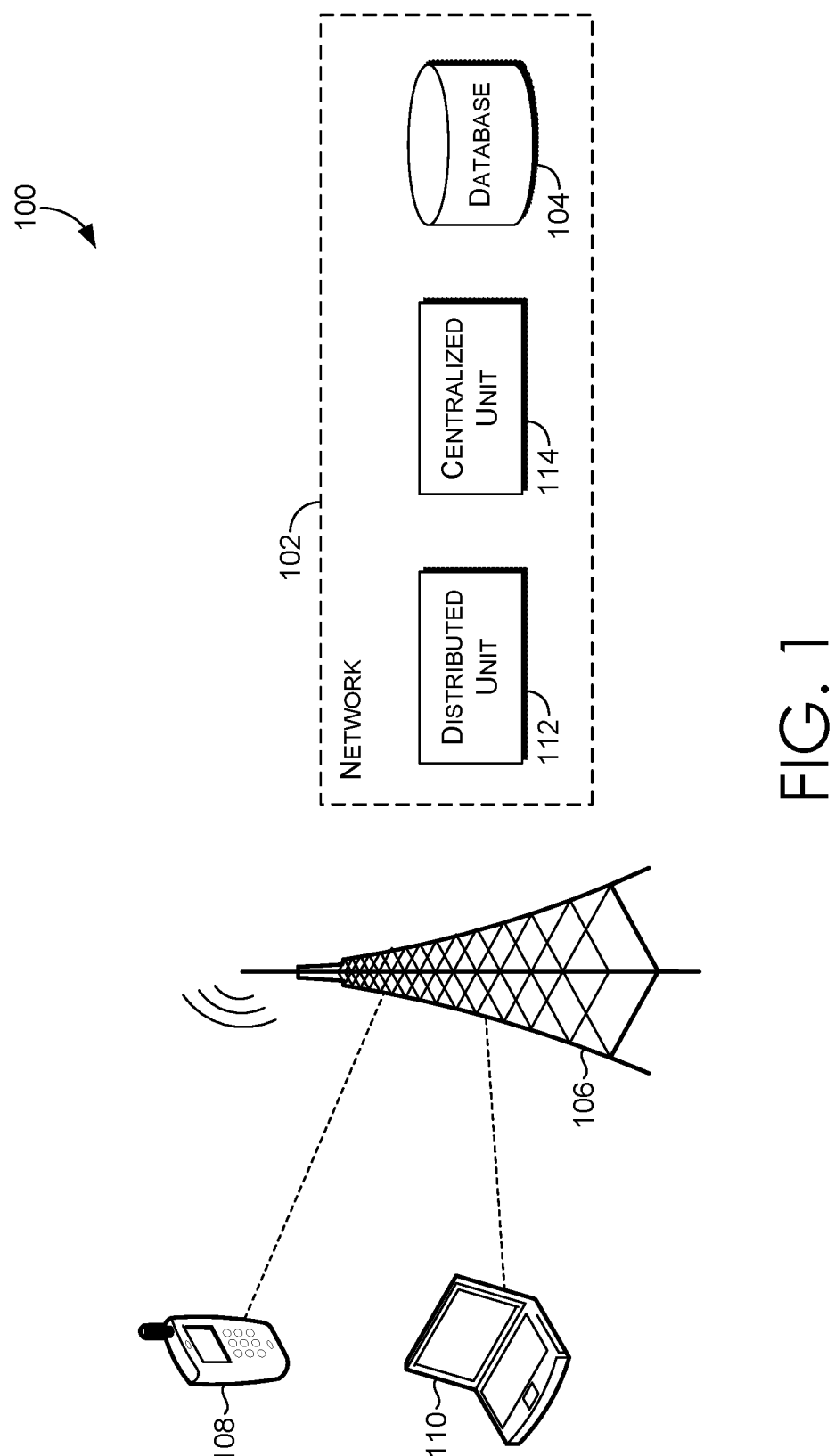
FIG. 1 depicts an example of a system environment for an application in accordance with one or more embodiments.

The subject matter of the present invention is being described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of the system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein.

Throughout this disclosure, several acronyms and shorthand notations are used to aid in the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| 3G | Third-Generation Wireless Access Technology |
| 4G | Fourth-Generation Wireless Access Technology |
| 5G | Fifth-Generation Wireless Access Technology |
| 5GC | Fifth-Generation Wireless Access Technology Core Network |
| CDMA | Code Division Multiple Access |
| CD-ROM | Compact Disk Read Only Memory |
| CU | Central unit |
| DU | Distribution unit |
| DVD | Digital Versatile Disc |
| EEPROM | Electrically Erasable Programmable Read-Only Memory |
| eMBB | Enhanced Mobile Broadband |
| E-UTRAN | Evolved Universal Mobile Telecommunications System |
| FD-MIMO | Full Dimension Multiple-Input Multiple-Output |
| GIS | Geographic/Geographical/Geospatial Information System |
| GPRS | General Packet Radio Service |
| GSM | Global System for Mobile Communications |
| IDEN | Integrated Digital Enhanced Network |
| IIOT | Industry Internet of Things |
| IOT | Internet of Things |
| LED | Light Emitting Diode |
| LTE | Long Term Evolution |
| MD | Mobile Device |
| MEC | Mobile Far Edge Computer |
| MIMO | Multiple-Input Multiple-Output |
| mMIMO | Massive Multiple-Input Multiple-Output |
| mMTC | Massive Machine Type Communication |
| mmWave | Millimeter Wave |
| NEXRAD | Next-Generation Radar |
| NR | New Radio |
| PC | Personal Computer |
| PCS | Personal Communications Service |
| PDA | Personal Digital Assistant |
| PLMN | Public Land Mobile Network |
| RAM | Random Access Memory |
| RAN | Radio Access Network |
| RF | Radio-Frequency |
| ROM | Read-Only Memory |
| RRU | Remote Radio Unit |
| RU | Radio Unit |
| SON | Self-Organizing Networks |
| TDMA | Time Division Multiple Access |

-continued

| TXRU | Transceiver |
| UE | User Equipment |
| UMTS | Universal Mobile Telecommunications System |
| URLLC | Ultra-Reliable Low Latency Communications |
| UTRAN | Universal Terrestrial Radio Access Network |
| WCD | Wireless Communication Device (interchangeable with UE) |
| WLAN | Wireless Local Area Network |
| XR | Extended Reality |

Further, various technical terms are used throughout this Detailed Description. An illustrative resource that fleshes out various aspects of these terms can be found in Newton's Telecom Dictionary, 25th Edition (2009).

Embodiments herein may be embodied as, among other things: a method, system, or set of instructions embodied on one or more computer-readable media. Computer-readable media includes both volatile and nonvolatile media, removable and non-removable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, DVDs or other optical disk storage, magnetic cassettes, magnetic tape, magnetic disk storage, or other magnetic storage device, or any other medium which can be used to store the desired information and which may be accessed by the computing device 800 shown in FIG. 8.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments. Examples of a network include a telecommunication network (e.g., 3G, 4G, 5G, CDMA, CDMA 1XA, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Globalnaya Navigazionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)).

"Base station" and "cell site" may be used interchangeably herein to refer to a defined wireless communications coverage area (i.e., a geographic area) serviced by a base station. It will be understood that one base station may control one cell site or, alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

"Access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "site," "base station," and "cell tower" are used interchangeably for simplicity and thus the terms should not be construed as limiting with regard to one another unless expressly designated as such in this Detailed Description. Examples of a cell site include macro cells such as a cell tower controlled by a gNodeB, as well as small cells, such as a femtocell or picocell. Accordingly, the scale and coverage area of an access point is not limited to the examples discussed, and any size and shape of coverage area is contemplated to be within the scope of the invention. Because a cell tower and a base station controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network.

"User equipment," "UE," "mobile device," "user device," and "wireless communication device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, mMIMO, 3G, 4G, 5G, and/or 802.11 protocols and techniques.

The term "hexbin" refers to a computerized algorithm and technique for partitioning a geospatial object, e.g., a map of a defined geographic region, into a plurality of adjacent hexagon shapes with defined boundaries. As such, adjacent hexbins share a common planar boundary defined by their shape. Hexbins may be used to represent information of the map of a defined geographic region as a type of grip-map. Although embodiments herein discuss and refer to the use of hexbins, it will understood that other partitioning techniques, other shapes, and the like are contemplated to be within the scope of the invention. As such, hexbins are used throughout and incorporated into the figures as a mere example that is helpful in illustrating and discussing embodiments.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

At a high level, embodiments discussed herein provide a system, method, and media for an application through with a prioritization schema that is generated using artificial intelligence/machine-learning techniques is provided. Generally, geo-located data for a defined geographic region is ingested and processed in the application so that the application can autonomously identify and prioritize precise site locations that are associated with impaired or degraded service quality and/or service coverage. Initially, the geo-located data for a particular geographic region is ingested and partitioned by the application based on geo-location data (e.g., GPS coordinates). The application generates a plurality of a hexbins that represent distinct coverage/service areas within the particular geographic region based on the geo-located data. As such, each hexbin can be used to visually (e.g., via a GUI) represent the geo-located data that corresponds to a particular scale or size (e.g., a defined quantity of meters of the geographic region of the corresponding hexbin. It will be understood from this Detailed Description that hexbins and the scales of such hexbins discussed herein are merely illustrative and non-limiting examples used for clarity of the discussion, as other shapes and scales for representing and analyzing the geo-located data for a particular geographic region are presently contemplated to be within the scope of the invention. Continuing, the hexbins may be arranged relative to one another, and further, may be arranged as overlaying a base layer of a geographic map that accurately represents the corresponding geo-located data for each hexbin within the particular geographic region. The hexbins may be displayed via a GUI generated through the application as overlaying the base layer of the geographic map of the corresponding particular geographic region. In embodiments, the scale or "size" of the hexbins can be modified to increase or decrease the data granularity of the distinct coverage/service areas within the particular geographic region. In the GUI, each hexbin may be displayed using a color-coded and/or pattern-based schema that visually distinguishes between and represents a level or quantification of wireless UE service quality and/or coverage, as autonomously determined by the application using the geo-located data for that coverage/service area corresponding to the particular hexbin.

The application can further receive data that defines the geo-location of one or more pending, planned, anticipated, and/or recently deployed cell sites (referred to as a "new site deployment(s)") within the particular geographic region. The application can determine the locations of the new site deployments from the data that defined the data that defines their geo-locations. The application can further identify, for each of the new site deployments, a set of hexbins that include and/or are adjacent to each new site deployment, based on the application calculating a predefined radius (i.e., a "buffer zone" or "buffer area") around each new site deployment. The predefined radius may be specific to the particular geographic region, the type of site (e.g., a macrocell such as a base station, a microcell such as a femtocell, or a picocell) associated with the new site deployment, or a combination thereof. The application can identify the geo-located data that corresponds to the sets of hexbins within the buffer area of each of the new cell deployments, and can determine this set of go-located data (i.e., buffer area hexbin data) is to be omitted, disregarded, or otherwise filtered out by the application. The application determines to filter out this data when making subsequent determinations, as those new deployment locations are predicted to address and/or cure any hexbins having geo-located data demonstrating impaired or degraded service quality and/or service coverage.

Continuing, the application uses a machine learning algorithm that includes, for example, a "Density-based Spatial Clustering of Applications with Noise" (DBSCAN) type of algorithm in order for the application to analyze the remaining hexbin geo-located data (i.e., subsequent to filtering out the buffer area hexbin data). Using the DBSCAN algorithm, a plurality of clusters or sets of adjacent/neighboring hexbins that are determined to satisfy one or more thresholds for impaired or degraded service quality and/or service coverage are autonomously identified. The plurality of clusters may be formed when a minimum quantity of adjacent hexbins that satisfy one or more thresholds for impaired or degraded service quality and/or service coverage are identified. As such, the one or more thresholds may define values for measuring impaired or degraded service quality and/or service coverage. Hexbins that do not correspond to a cluster are omitted from subsequent analysis, such that the DBSCAN algorithm operates to filter out a portion of the remaining hexbin geo-located data. That portion of hexbin data filtered or omitted by the DBSCAN algorithm does not satisfy one or more of the thresholds employed to create a cluster. Although the DBSCAN algorithm is discussed herein as an example, other clustering algorithm(s) are contemplated to be within the scope of the invention for the same or similar purpose, whether alone or in tandem with the DBSCAN algorithm.

For each cluster or set of hexbins, the machine learning algorithm determines potential solutions for improving the impaired or degraded service in the distinct coverage/service areas that correspond to the cluster within the particular geographic region. The machine learning algorithm uses the geo-located data in a cluster to determine which of one or more potential solutions for improving the service for that cluster. As further discussed hereinafter, the machine learning algorithm identifies whether there is one or more of a tilt solution, a low band solution, a lease agreement solution, a small cell solution, a macro cell solution, no solution, or any combination thereof, said determinations being made concurrently or in various defined sequences, in various embodiments. Continuing, each cluster is ranked/prioritized relative to other clusters in the particular region based on population data, such as the total quantity of customer reports of impaired coverage for the cluster and/or the total volume of traffic associated with that cluster. Additionally or alternatively, each cluster is ranked/prioritized relative to other clusters based on the solution type. In any case, the solutions can be implemented for each cluster in accordance with the prioritization to improve the impaired or degraded service in the coverage/service areas that correspond to each cluster.

Turning now to FIG. 1, a system 100 is provided. In embodiments, the system 100 includes a telecommunication network 102 that is communicatively coupled to a database 104. The database 104 receives, obtains, indexes, and/or otherwise stores telecommunication service data for one or more defined geographic areas in memory, whether physical, virtual, or a combination thereof. The telecommunication network 102 includes a plurality of cell sites, such as base station 106 that are physically distributed across one or more defined geographic areas to provide service coverage to a plurality of user equipment, such as user devices 108, 110, and 112. As such the plurality of cell sites provide user equipment with connectivity to the telecommunication network 102. The telecommunication network 102 can include additional hardware and software, such as a Distributed Unit 114 and a Centralized Unit 116, which may include one or more processors and memory (not shown) for executing computer programming code to run various software applications. The system 100 and its components, modules, hardware, and software may be used to execute, run, and/or host a computerized application that perform a method as further discussed herein. The application may be run in whole or partially across several devices, such as user devices 108, 110, and 112, Distributed Unit 114, a Centralized Unit 116, and/or by a computing device that connects to the backhaul of the telecommunication network 102. As such, the location of processors used to execute the application can vary across embodiments, and the system 100 provides an appropriate environment.

In embodiments, the system 100 requests, receives, obtains, retrieves, and/or collects telecommunication service data over the telecommunication network 102 for user devices 108, 110, and 112 and stores the data in the database 104. Additionally or alternatively, the system 100 receives, obtains, retrieves, and/or collects telecommunication service data from the Distributed Unit 114 and the Centralized Unit 116 and stores the data in the database 104. The telecommunication service data can include and encode, for example, information, metrics, and measurements of network performance: sector metrics such as uplink speed, downlink speed, signal strength; site data such as Reference Signal Received Power (RSRP) samples; coverage data such as quantities of unique user equipment reporting impaired or degraded service connections/coverage; telecommunications metrics such as downlink backhaul speeds; population data such as uncovered population data (e.g., areas where there is a lack of service coverage) for one or more specific services types (e.g., LTE, 5G), volume of traffic, voluntary user equipment account deactivations; and the like. The telecommunication service data can also include and encode, for example, information specifying the geo-location information (e.g., GPS coordinates, a unique sector identifier, a unique base station identifier, a zip code associated with a user account) of the device, base station, and/or antenna utilized to capture and/or communicate the information, metrics, and measurements of network performance to the system 100. The telecommunication service data can include and encode, for example, information specifying whether the geo-location information is categorized as a high-population or low-population density area, such as an urban area versus a rural area. In embodiments, the telecommunication service data is stored in the database 104 with mapping, linking, or other association with a corresponding geographic location, such that this information can be ingested and utilized by the application discussed hereinafter, with geographic specificity.

In the system 100, the application requests, receives, or retrieves the telecommunication service data for a defined geographic area from the database 104. The application also identifies, automatically and without user intervention, a plurality of new site deployment locations within the defined geographic area. As such, the application obtains both the telecommunications service data and new deployment location data for the defined geographic area. The application can compare and relate the telecommunications service data and new deployment location data to the defined geographic area. Accordingly, the precise geographic location (e.g., GPS coordinates) associated with discrete data points in the telecommunications service data and the precise geographic location of each new deployment location are recognized by the application as corresponding to particular areas within the defined geographic area, for example, and the precise locations can be displayed via a graphical user interface of the application. The graphical user interface may display one or more areas within the defined geographic area as individual hexbins that are color-coded in a manner that represents the values of one or more metrics of the service coverage and/or service quality in each area, for example. In one particular example, hexbins having RSRP values that are below one or more various quality thresholds may be color coded using various intensities of the color red whereas hexbins having RSRP values that are meet or exceed one or more other quality thresholds may be color coded using various intensities of the color green. Hexbins for which there is no corresponding data may not be shaded (e.g., white or black), may lack visible boundaries/shape, and/or may be omitted from the graphical user interface, in such examples.

The application may calculate, determine, and/or identify a buffer area that correspond to or is associated with a new site deployment locations. For example, for each new site deployment location, a buffer area is identified by calculating the half distance between two or more (e.g., three) existing active ("on air") site(s) nearest the new site deployment location. In such an example, the half distance is used as a radius for a circular or elliptically-shaped buffer area that surrounds or circumscribes the new site deployment location. Generally, the active sites are owned and operated by a telecommunications entity (e.g., T-Mobile). The buffer area represents the predicted coverage area of the new site deployment location. In one example, the graphical user interface may display a circular or elliptically-shaped boundary of the buffer area as overlaying areas/hexbins that are color-coded in a manner that represents the values of one or more metrics of the service coverage and/or service quality in each area. Additionally, icons or shapes may also be displayed in the graphical user interface to represent new site deployment location(s) and/or existing "on-air" cell site(s) as overlaying areas/hexbins for the defined geographic area.

The application then identifies a first plurality of data sets in the telecommunication service data that correspond to the buffer area for each of the plurality of new site deployment locations. For example, the first plurality of data sets include data having geographic location(s) that correspond to a set of hexbins that are located within the buffer area that was calculated. As such, the application can identify specific portions of the telecommunication service data that correspond to and/or which are within the boundaries of one or more buffer areas of new deployment location(s) within the defined region. The application filters the first plurality of data sets "out" from the telecommunication service data, such that a second plurality of data sets in the telecommunication service data remains. As such, the second plurality of data sets are specific portions of the telecommunication service data that lie outside of the boundaries of the buffer areas of new deployment location(s) within the defined region. The second plurality of data sets are, therefore, a portion of the telecommunication service data that is predicted to not be within any coverage area of the new site deployment location(s).

The application generates a plurality of clusters within the defined geographic region using one or more metrics obtained from the second plurality of data sets. In other words, first plurality of data sets are omitted from the cluster generation, as the first plurality of data sets were intentionally filtered out of consideration in this process by the application. The plurality of clusters specifically correspond to areas that have impaired or degraded service quality and/or service coverage, as these clusters are identified based on one or more metrics such as RSRP values. In a further embodiment, the plurality of clusters specifically correspond to areas that have impaired or degraded service quality and/or service coverage, as these clusters are identified based on one or more metrics such as RSRP values in view of whether the defined geographic area is categorized as a high-population or low-population density area. For example, the application may identify clusters having an RSRP value at or below −114 decibel-milliwatts (dBm) for a high-population density area whereas the application may identify clusters having an RSRP value at or below −110 for a low-population density area. Generally, the power of a signal increases as the dBm value approaches zero (e.g., an RSRP value of −114 dBm indicated a signal with lower power than signal having an RSRP value of −85 dBm).

Each of the plurality of clusters can be generated, determined, and/or identified by the application using a machine learning clustering algorithm, such as a DBSCAN, for example. In various embodiments, the machine learning clustering algorithm also removed noise from the telecommunications data in the second plurality of data sets. The machine learning clustering algorithm generates each cluster and each cluster includes a portion of the second plurality of data sets. Each cluster may represent one or more telecommunications data of neighboring and/or adjacent areas within the defined areas. Each cluster may be associated with impaired or degraded service quality and/or service coverage, as determined in the telecommunication data within the second plurality of data sets.

For each cluster in the plurality of clusters, the application determines a solution type and a specific location within the cluster for deployment of the solution type. The specific location may be defined using coordinates that are within the boundaries of the cluster within the particular geographic area. The solution type may define one or more various actions and/or equipment deployments/utilization or modifications that, when implemented, provide and/or improve service quality and/or service coverage for some or all user equipment located within an area that corresponds to the cluster. The solution type may be identified, in some aspects, via the application examining a variety of potential solution types in a defined sequence or concurrently. For example, solution types may include a tilt solution (e.g., uptilt), a low-band solution, a lease solution, a small cell solution, a macro cell solution, no solution available, and/or a combination thereof. In some embodiments, the application can identify only one "best fit" solution type for each precise "specific" location within the cluster for deployment of the solution type. In other embodiments, the application can identify only a plurality or a set of solution types for each precise location within the cluster for deployment of the solution type(s). In some embodiments, the application can identify only one "best fit" solution type for each precise "specific" location within the cluster for deployment of the solution type. In other embodiments, the application can identify only a plurality or a set of solution types for each precise location within the cluster for deployment of the solution type(s).

In embodiments, a tilt solution refers to determining, by the application, whether an active site can provide service coverage to an area within the defined geographic area corresponding to the cluster by modifying antenna tilt at the active deployment location.

For example, a tilt solution may be identified and/or determined by the application examining and analyzing whether one or more active sites that are within proximity to the cluster (e.g., based on a predefined or threshold distance of the cluster and/or its boundary, or one or more of the nearest active sites to the cluster and/or its boundary) have one or more antenna for which an antenna may be electronically uptilted by a quantity of degrees (e.g., 4 degrees) to provide service coverage to all or a portion of the cluster. In some embodiments, an antenna at each of more than one neighboring active site may be electronically uptilted by a quantity of degrees to provide service coverage to one or more areas in the cluster. In one example, the application can determine that there is no tilt solution available for a particular cluster when there are no active sites adjacent to the cluster, and/or when any of the neighboring active sites cannot be modified via tilt to provide coverage to the cluster (e.g., whether a portion, a threshold minimum area, or a threshold percentage of the cluster's area).

In embodiments, a low-band solution refers to determining, by the application, whether an active site can provide service coverage to an area within the defined geographic area corresponding to the cluster by utilizing a low band frequency at or below 1 GHz (or within a buffer frequency range of 1 GHz). The low-band solution may include the application identifying one or more active sites having existing low-band capabilities and/or identifying one or active sites to which low-band capabilities could be readily added via equipment, where the one or more active sites are proximate to some portion of the cluster (e.g., based on a predefined or threshold distance of the cluster and/or its boundary, or one or more of the nearest active cell sites to the cluster and/or its boundary). In one an example, the application can determine that there is no low-band available for a particular cluster when there are not active sites with low band capability in proximity to the particular cluster and/or when one or more active sites that are in proximity to the particular cluster cannot be modified to provide low-band frequency coverage.

In embodiments, a lease solution refers to determining, by the application, whether an active lease-agreement site can provide service coverage to an area within the defined geographic area corresponding to the cluster. For example, the application may identify one or more neighboring active sites that are operated by a different entity, meaning that these active sites can be utilized by the telecommunication entity based on an active lease agreement with another entity that operates the cell site. In such examples, the application may identify whether the one or more neighboring active sites are predicted to have (or is capable of providing) service coverage to all or some portion of the cluster. The application may use a threshold or other value in this solution identification and determination, for example, to determine whether the one or more neighboring active sites are predicted to provide coverage to at least a threshold percentage (e.g., 50%, 60%, 75%, 90%, or ranges thereof) of the cluster area and/or to a minimum area (e.g., a predefined square kilometers) of the cluster area. In one example, the application can determine that there is no lease solution available for a particular cluster when there are no neighboring active sites for lease adjacent to the cluster, and/or when any of the neighboring active sites for lease cannot meet the threshold or minimal service area coverage for the particular cluster.

In embodiments, a small cell solution refers to determining, by the application, whether deployment of a new small cell can provide service coverage to an area within the defined geographic area corresponding to the cluster based on a predefined proximity threshold of the cluster relative to a fiber-optic network. For example, the application may determine that one or more small cells, or a set of small cells, if deployed in one or more precise locations in or near the cluster, are predicted to provide service coverage to all or a portion of the cluster. In on such an example, the application may additionally determine whether a fiber-optic network is existing and located within or neighboring the cluster (e.g., threshold distance) such that the one or more small cells or a set of small cells could be deployed and connected to the fiber-optic network to provide service coverage to all or a portion of the cluster. In such an example, when there are no fiber-optic networks within range/proximity of a particular cluster, the application can determine that there is no small cell solution available for that particular cluster.

In various aspects, a macro cell solution may be identified when none of the other solution types (i.e., a tilt solution, a low-band solution, a lease solution, a small cell solution) are all determined to be unavailable or unfeasible, by the application. For example, the application may evaluate each of a tilt solution, a low-band solution, a lease solution, and a small cell solution, which when each is determined to be unavailable, the application may determine that the macro cell solution is the best fit solution that remains. In some aspects, the application may determine that there is no solution available, when none of the other solution types (i.e., a tilt solution, a low-band solution, a lease solution, a small cell solution, and a macro cell solution) are available.

Continuing, the application in the system 100 may rank each cluster in the plurality of clusters relative to one another based on the total quantity of customer reports of impaired coverage for the cluster and/or the total volume of traffic associated with that cluster. For example, the application may identify and determine the total quantity of customer reports of impaired coverage for the cluster and/or the total volume of traffic associated with that cluster using data retrieved from the database 104, and compare each cluster to one another using that data. The cluster having the greatest total quantity of customer reports of impaired coverage for the cluster, the greatest total volume of traffic, and/or the greatest of both combined, may be assigned the highest rank relative to the other clusters. In this manner, the clusters may be ranked in an order as the total quantities of customer reports of impaired coverage for the cluster and/or the total quantities total volume of traffic decrease (e.g., as qualities decrease, priority and rank of the correspond cluster decreases).

Additionally or alternatively, the application in the system 100 may rank each cluster in the plurality of clusters relative to one another based on the solution type and/or the precise location identified. For example, each of the plurality of clusters may be ranked in sequence to indicate a precedence of solutions for the clusters. The clusters may be ranked based on the solution type (e.g., a tilt solution having precedence over a low-band solution, a low band solution having precedence of a lease solution, a lease solution having precedence over a small cell solution, and a small cell solution having precedence over a macro solution; or any various sequence thereof). In one example, the clusters may be ranked relative to each other based on solution type such that cluster(s) for which a macro cell solution is determined by the application are given a higher/greater ranking than cluster(s) associated with small cell solutions, which have a higher/greater ranking than cluster(s) associated with lease solutions, which have a higher/greater ranking than cluster(s) associated with low-band solutions, which have a higher/greater ranking than cluster(s) associated with tilt solutions. The clusters may alternatively be ranked based on the RSRP values associated with the hexbins in the cluster, such that the clusters having the "worst" average/median RSRP values (e.g., lowest signal power, no coverage, poor coverage) are ranked higher than clusters having relatively better average/median RSRP values.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing a communication links between the components shown in FIG. 1, may be utilized in implementations of the present invention. It will be understood to those of ordinary skill in the art that the components may be connected in various manners, hardwired or wireless, and may use intermediary components that have been omitted or are not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

FIG. 2 provides a method 200. In some embodiments, the method 200 can be a computer-implemented method that is performed automatically and without requiring user input and/or user interaction. In one embodiment, one or more non-transitory computer-readable storage media having computer-readable instructions or computer-readable program code portions embodied thereon, for execution via one or more processors, can be used to implement and/or perform the method 200. For example, computer-readable instructions or computer-readable program code portions can specify the performance of the method 200, can specify a sequence of steps of the method 200, and/or can identify particular component(s) of software and/or hardware for performing one or more of the steps of the method 200. The computer-readable instructions or computer-readable program code portions can correspond to an application and/or an application programming interface (API), in some embodiments. In one embodiment, the application or API can implement and/or perform the method 200. As discussed below, the method 200 can be performed using software, hardware, component(s), and/or device(s) depicted in the example of FIG. 1. As such, one or more of the steps or actions discussed may be the same, similar, and/or overlap with previously described actions discussed in the context of FIG. 1.

Figure 3:
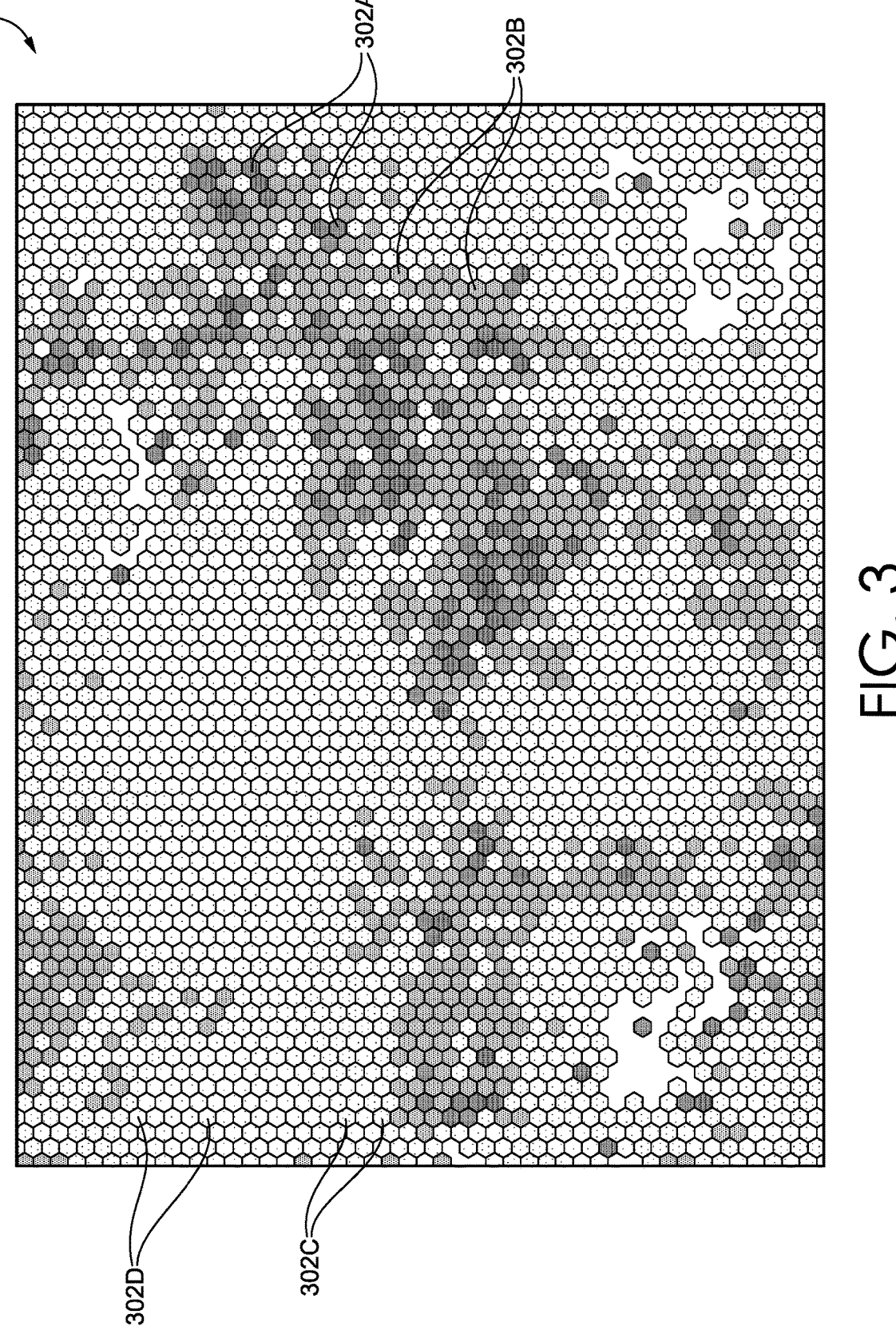
FIG. 3 depicts a graphical user interface that displays a plurality of representative hexbins visually coded by service quality/coverage and icons for active "on-air" cell sites, as overlaying a corresponding geospatial object in accordance with one or more embodiments.
Figure 4:
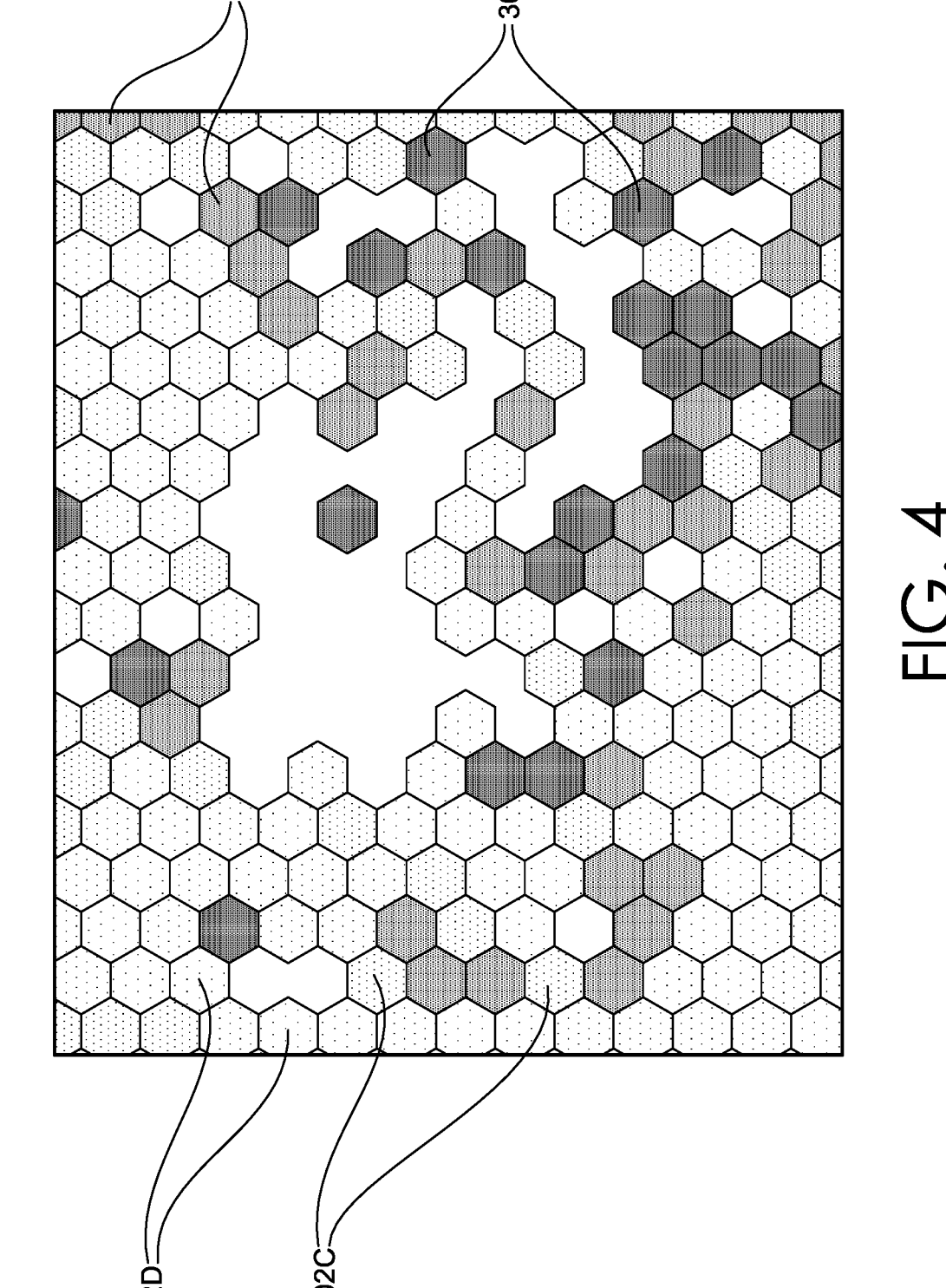
FIG. 4 illustrates a detail of FIG. 3, showing neighboring hexbins output by the computerized algorithm having partitioned a geospatial object in accordance with one or more embodiments.

At block 202, telecommunication service data is received for a defined geographic area. The telecommunication service data can include values for Reference Signal Received Power (RSRP) measurements, coverage metrics, uncovered population data, sector metrics, downlink backhaul speeds, or any combination thereof, for example. In embodiments, the telecommunication service data is partitioned into a plurality of hexbins that represent a plurality of areas within the defined geographic area. For example, FIG. 3 depicts a graphical user interface 300 for an application that displays the plurality of representative hexbins 302A, 302B, 302C, and 302D that are each visually coded by service quality/ coverage and icons 304A, 304B, and 304C that are placed to show the location of existing active sites, as overlaying a corresponding geospatial object, which acts as a map of the defined geographic area. FIG. 4 provides a detail 400 of the graphical user interface 300 of FIG. 3, which depicts the plurality of representative hexbins 302A, 302B, 302C, and 302D that have been output by a computerized algorithm of an application that partitioned a geospatial object, such as a defined geographic area. Each hexbin in the plurality of hexbins is associated with a corresponding data set for a corresponding area within the plurality of areas, in embodiments. For example, each hexbin may correspond to a unique and non-overlapping particular 20-30 m² area within the defined geographic area. Further, in this example, the hexbin is associated with, linked to, mapped to, and/or corresponds to a particular data set in the telecommunication data, where that particular data set includes recorded historical values and/or other metric measurements that are specific to service coverage and quality within the particular 20-30 m² area. It will be understood that the area discussed for a hexbin is merely an example as other sizes, other size ranges, and other scales of hexbin size are contemplated to be within the scope of the embodiments herein. In various embodiments, the corresponding data set can include values for Reference Signal Received Power (RSRP) measurements, coverage data, uncovered population data, sector metrics, downlink backhaul speed data, or a combination thereof, for a corresponding area within the plurality of areas. The corresponding data set may include recorded historical values and/or other metric measurements reported by user equipment, user devices, base stations, and/or other cells are reporting the service coverage and quality when located within the particular area corresponding to the particular hexbin. The telecommunication service data may be received from a database, as previously discussed, using an identifier for the defined geographic area (e.g., a zip code, a street address, a city name, a state name, a unique identifier for a region or cell site).

At block 204, a plurality of new site deployment locations are identified within the defined geographic area. The plurality of new site deployment locations may be identified using information received from the database or another data source. The new site deployment locations may be defined or selected previously by the telecommunication entity, for example. The coordinates of the new site deployment locations may be ingested by an application that identifies and maps the new site deployment locations relative to the defined geographic area, and items therein such as existing active sites, fiber-optic networks, cities, streets, geographic markers, and the like. As such, in some embodiments, the method 200 includes, via the application, generating and causing display of a graphical user interface, the graphical user interface displaying the a plurality of hexbins that partition the defined geographic area into a plurality of areas, each of the plurality of hexbins being visually coded to indicate the one or more metrics corresponding to the hexbin (i.e., a corresponding data set).

Figure 5:
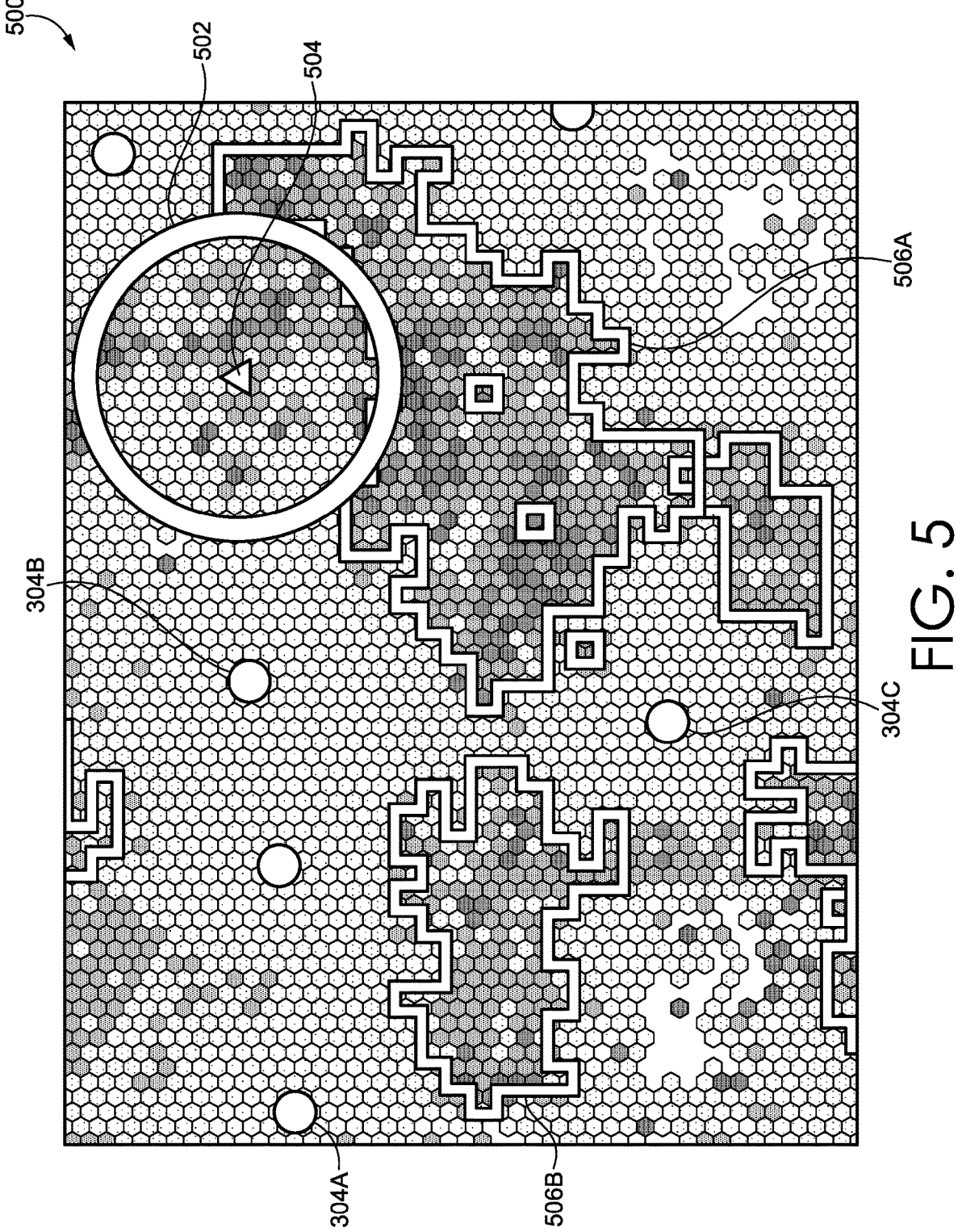
FIG. 5 depicts the graphical user interface of FIG. 4, further displaying buffer areas surrounding new deployment locations and a plurality of clusters, as overlaying the corresponding geospatial object in accordance with one or more embodiments.

At block 206, a buffer area is identified for each of the plurality of new site deployment locations. As such, a plurality of buffer areas are identified within the defined geographic area, one buffer area for each new site deployment location, in embodiments. For example, FIG. 5 depicts the graphical user interface 300 of FIG. 3, further displaying one or more buffer areas 502 surrounding icons 504 that represent one or more new deployment locations. Each buffer area may be displayed as having a predicted service coverage boundary, which though shown as circular, may be any size or shape in actuality.

At block 208, a first plurality of data sets are identified in the telecommunication service data that correspond to the buffer area for each of the plurality of new site deployment locations. At block 210, the first plurality of data sets are filtered out from the telecommunication service data, wherein a second plurality of data sets in the telecommunication service data remains. In some embodiments, for example as shown in FIG. 5, hexbins that are located at or within the one or more buffer areas 502 may be visually modified in the graphical user interface 500 and visually re-coded (e.g., shading, color change, transparency) as displayed to indicate that, despite being associated with one or more poor RSRP values, for example, these buffer-area hexbins are predicted to become associated with improved RSRP values based on their proximity to the new deployment locations. In this manner, the graphical user interface 500 further provides a visually "filtering out" of the data that reflects the application's filtering of the telecommunication service data.

At block 212, a plurality of clusters are generated as located within the defined geographic region using one or more metrics obtained from the second plurality of data sets. Turning again to FIG. 5, the graphical user interface 500 displays a plurality of clusters 506A and 506B with boundaries, shown as overlaying the defined geographic area. As such, in some embodiments, the method 200 includes, via the application, generating and causing display of a graphical user interface, the graphical user interface displaying the plurality of clusters within the defined geographic region and the specific location within each of the plurality of clusters for deployment of the solution type determined, each of the plurality of clusters being visually coded to distinguish each cluster from one another (e.g., borders or boundaries of the cluster), and the specific location for each of the plurality of clusters being visually coded to indicate a particular solution type for deployment.

Figure 6:
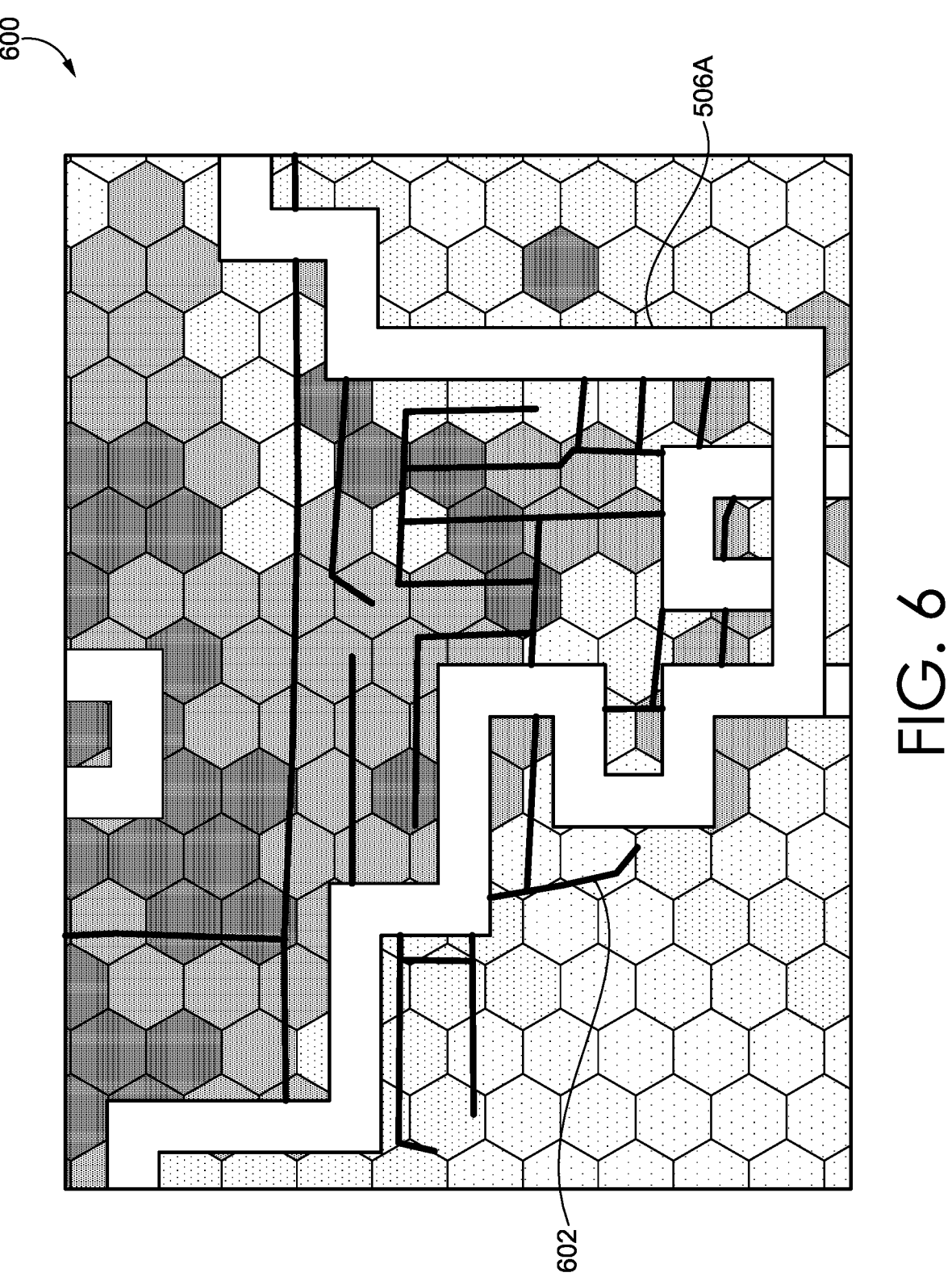
FIG. 6 depicts a detail of the graphical user interface of FIG. 5, further displaying existing fiber-optic networks, as overlaying the corresponding geospatial object in accordance with one or more embodiments.

At block 214, for each cluster in the plurality of clusters, a solution type and a specific location within the cluster for deployment of the solution type are identified. When identifying a solution type, the application can examine and determine whether an active site can provide service coverage to an area within the defined geographic area corresponding to the cluster by modifying antenna tilt at the active deployment location, in embodiments. The application can request, receive, obtain, and/or retrieve location coordinates of one or more or all active sites with the defined geographic area, and compare the proximity of the active sites to the cluster(s), as previously discussed. The application can examine and determine whether an active site can provide service coverage to an area within the defined geographic area corresponding to the cluster by utilizing a low band frequency at or below 1 GHz, in some embodiments. The application can request, receive, obtain, and/or retrieve location coordinates of one or more or all active sites with the defined geographic area as well as equipment information for those active sites. The application can compare the proximity of the active sites to the cluster(s), as previously discussed, and examine whether each active site has low-band capability or can be modified to have low-band capability. In various embodiments, the application can examine and determine whether an active lease-agreement site can provide service coverage to an area within the defined geographic area corresponding to the cluster. The application can request, receive, obtain, and/or retrieve location coordinates of one or more or all active lease-agreement site with the defined geographic area, and compare the proximity of the active lease-agreement site to the cluster(s), as previously discussed. In embodiments, the application can examine and determine whether deployment of a new small cell can provide service coverage to an area within the defined geographic area corresponding to the cluster based on a predefined proximity threshold of the cluster relative to a fiber-optic network. For example, FIG. 6 depicts a detail 600 of the graphical user interface 500 of FIG. 5, further displaying existing fiber-optic lines 602, shown as solid black lines overlaying the corresponding geospatial object in accordance with one or more embodiments, as proximate to and/or within the cluster 506A. The application can request, receive, obtain, and/or retrieve location coordinates of one or more or all fiber-optic network lines with the defined geographic area, and compare the proximity of the fiber-optic network lines to the cluster(s), as previously discussed.

Figure 7:
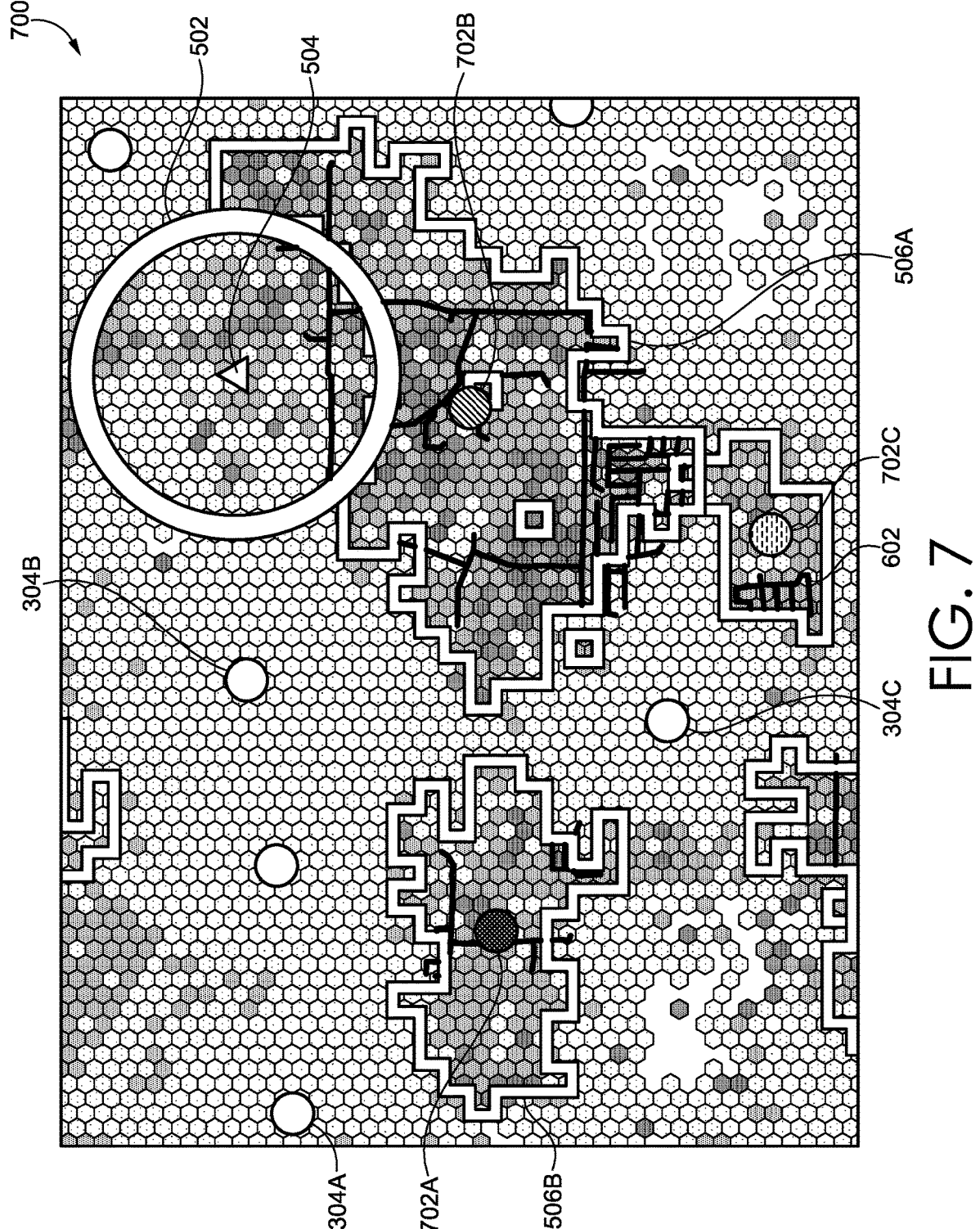
FIG. 7 depicts the graphical user interface of FIG. 6 as further displaying one or more output solution types and precise locations for deployment of the solution types, as overlaying the corresponding geospatial object in accordance with one or more embodiments.

At block 216, each cluster in the plurality of clusters is ranked relative to one another. In embodiments, the application may rank each cluster in the plurality of clusters relative to one another based on the total quantity of customer reports of impaired coverage for the cluster within the cluster and/or the total volume of traffic associated with that cluster, as previously discussed. Additionally or alternatively, the application may rank each cluster in the plurality of clusters relative to one another based on the solution type and/or based on the specific location within the cluster for deployment of the solution type, as previously discussed. For example, FIG. 7 depicts a graphical user interface 700 further displaying one or more output solution types and precise locations 702A, 702B, and 704B for deployment of the solution types, as overlaying the defined geographic area. Each solution type, being displayed at the precise corresponding location determined by the application, may be visually distinguished from existing active sites that are owned and operated by the telecommunications entity, the new deployment locations, the active lease-agreement sites, and/or fiber-optic network lines suing one or more of color, shape, size, shading, animation, and/or other visual depiction in the graphical user interface 700.

Figure 8:
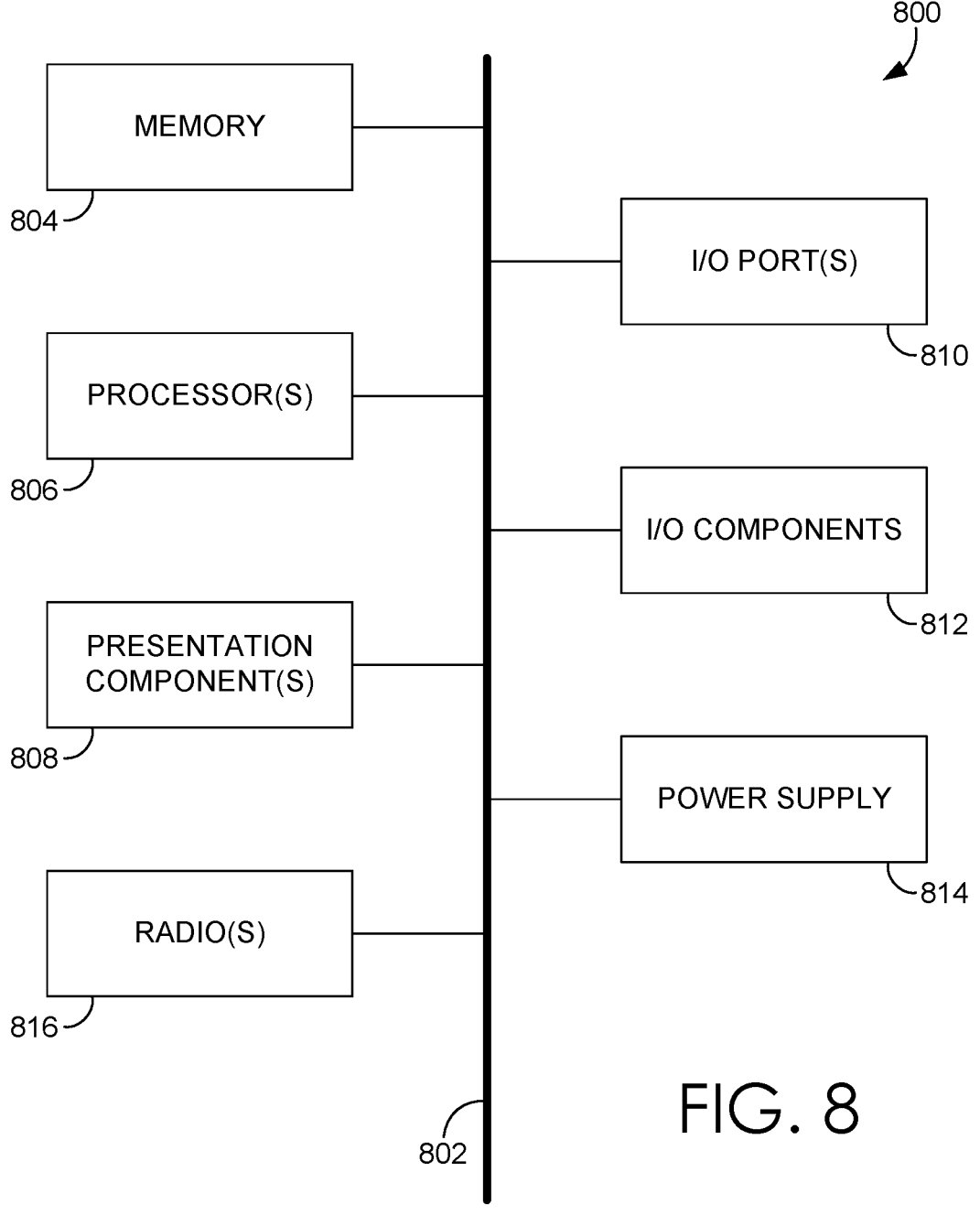
FIG. 8 illustrates an example computing device suitable for use in implementations of the present disclosure.

Turning now to FIG. 8, a diagram is depicted of an example computing device 800 suitable for use in implementations of the present disclosure. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-execut-able instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, and power supply 814. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of the I/O components 812. Also, processors, such as one or more processors 806, have memory. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 804 includes computer-storage media in the form of volatile and/or nonvolatile memory. Memory 804 may be removable, non-removable, or a combination thereof. Examples of memory include solid-state memory, hard drives, optical-disc drives, etc. Computing device 800 includes one or more processors 806 that read data from various entities such as bus 802, memory 804 or I/O components 812. One or more presentation components 808 present data indications to a person or other device. Examples of one or more presentation components 808 include a display device, speaker, printing component, vibrating component, etc. I/O ports 810 allow computing device 800 to be logically coupled to other devices, including I/O components 812, some of which may be built in computing device 800. Examples of I/O components 812 include a microphone, joystick, game pad, satellite dish, scanner, printer, wireless device, etc.

Radio 816 represents a radio that facilitates communication with a wireless telecommunication network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunication network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:
   receiving telecommunication service data within a defined geographic area;
   identifying a plurality of new site deployment locations within the defined geographic area;
   identifying a buffer area for each of the plurality of new site deployment locations;
   identifying a first plurality of data sets in the telecommunication service data that correspond to the buffer area for each of the plurality of new site deployment locations;
   filtering the first plurality of data sets from the telecommunication service data, wherein a second plurality of data sets in the telecommunication service data remains;
   generating a plurality of clusters within the defined geographic region using one or more metrics obtained from the second plurality of data sets;
   for each cluster in the plurality of clusters, determining a solution type and a specific location within the cluster for deployment of the solution type; and
   ranking each cluster in the plurality of clusters relative to one another based on a precedence of the determined solution type for the cluster relative to the precedence of the solution type for other clusters of the plurality of clusters.

2. The computerized method of claim 1, wherein the telecommunication service data comprises values for Reference Signal Received Power (RSRP) measurements, coverage metrics, uncovered population data, sector metrics, downlink backhaul speed, or a combination thereof.

3. The computerized method of claim 1 further comprising partitioning the telecommunication service data into a plurality of hexbins that represent a plurality of areas within the defined geographic area, each hexbin in the plurality of hexbins being associated with a corresponding data set for a corresponding area within the plurality of areas, the corresponding data set comprised of values for Reference Signal Received Power (RSRP) measurements, coverage data, uncovered population data, sector metrics, downlink backhaul speed data, or a combination thereof, for a corresponding area within the plurality of areas.

4. The computerized method of claim 1, wherein, for each cluster in the plurality of clusters, determining the solution type and the specific location within the cluster for deployment of the solution type comprises:
   determining whether an active site can provide service coverage to an area within the defined geographic area corresponding to the cluster by modifying antenna tilt at the active deployment location.

5. The computerized method of claim 1, wherein, for each cluster in the plurality of clusters, determining the solution type and the specific location within the cluster for deployment of the solution type comprises:
   determining whether an active site can provide service coverage to an area within the defined geographic area corresponding to the cluster by utilizing a low band frequency at or below 1 GHz.

6. The computerized method of claim 1, wherein, for each cluster in the plurality of clusters, determining the solution type and the specific location within the cluster for deployment of the solution type comprises:
   determining whether an active lease-agreement site can provide service coverage to an area within the defined geographic area corresponding to the cluster.

7. The computerized method of claim 1 wherein, for each cluster in the plurality of clusters, determining the solution type and the specific location within the cluster for deployment of the solution type comprises:
   determining whether deployment of a new small cell can provide service coverage to an area within the defined geographic area corresponding to the cluster based on a predefined proximity threshold of the cluster relative to a fiber-optic network.

8. One or more non-transitory computer-readable media storing instructions that when executed via one or more processors performs a computerized method, the media comprising:
   via one or more processors, without user intervention:
   receiving telecommunication service data a defined geographic area;
   identifying a plurality of new site deployment locations within the defined geographic area;
   identifying a buffer area for each of the plurality of new site deployment locations;
   identifying a first plurality of data sets in the telecommunication service data that correspond to the buffer are for each of the plurality of new site deployment locations;

filtering the first plurality of data sets from the telecommunication service data, wherein a second plurality of data sets in the telecommunication service data remains;

generating a plurality of clusters within the defined geographic region using one or more metrics obtained from the second plurality of data sets;

for each cluster in the plurality of clusters, determining a solution type and a specific location within the cluster for deployment of the solution type; and ranking each cluster in the plurality of clusters relative to one another based on a precedence of the determined solution type for the cluster relative to the precedence of the solution type for other clusters of the plurality of clusters.

9. The media of claim 8 further comprising, via the one or more processors without user intervention, generating and causing display of a graphical user interface, the graphical user interface displaying the plurality of clusters within the defined geographic region and the specific location within each of the plurality of clusters for deployment of the solution type determined, each of the plurality of clusters being visually coded to distinguish each cluster from one another, and the specific location for each of the plurality of clusters being visually coded to indicate a particular solution type for deployment.

10. The media of claim 8 further comprising, via the one or more processors without user intervention, generating and causing display of a graphical user interface, the graphical user interface displaying the a plurality of hexbins that partition the defined geographic area into a plurality of areas, each of the plurality of hexbins being visually coded to indicate the one or more metrics corresponding to the hexbin.

11. The media of claim 8 wherein determining the solution type and the specific location within the cluster for deployment of the solution type comprises, via the one or more processors without user intervention:

determining whether an active site can provide service coverage to an area within the defined geographic area corresponding to the cluster by modifying antenna tilt at the active deployment location.

12. The media of claim 8, wherein, for each cluster in the plurality of clusters, determining the solution type and the specific location within the cluster for deployment of the solution type comprises, via the one or more processors without user intervention:

determining whether an active site can provide service coverage to an area within the defined geographic area corresponding to the cluster by modifying antenna tilt at the active deployment location.

13. The media of claim 8, wherein, for each cluster in the plurality of clusters, determining the solution type and the specific location within the cluster for deployment of the solution type comprises, via the one or more processors without user intervention:

determining whether an active site can provide service coverage to an area within the defined geographic area corresponding to the cluster by utilizing a low band frequency at or below 1 GHz.

14. The media of claim 8, wherein, for each cluster in the plurality of clusters, determining the solution type and the specific location within the cluster for deployment of the solution type comprises, via the one or more processors without user intervention:

determining whether an active lease-agreement site can provide service coverage to an area within the defined geographic area corresponding to the cluster.

15. The media of claim 8, wherein, for each cluster in the plurality of clusters, determining the solution type and the specific location within the cluster for deployment of the solution type comprises, via the one or more processors without user intervention:

determining whether deployment of a new small cell can provide service coverage to an area within the defined geographic area corresponding to the cluster based on a predefined proximity threshold of the cluster relative to a fiber-optic network.

16. A system comprising:

a database storing telecommunication service data for a defined geographic area;

a telecommunication network communicatively coupled to the database; and one or more processors communicatively coupled to the telecommunication network, the one or more processors configured to:

receiving telecommunication service data for a defined geographic area from the database;

identifying a plurality of new site deployment locations within the defined geographic area;

identifying a buffer area for each of the plurality of new site deployment locations;

identifying a first plurality of data sets in the telecommunication service data that correspond to the buffer area for each of the plurality of new site deployment locations;

filtering the first plurality of data sets from the telecommunication service data, wherein a second plurality of data sets in the telecommunication service data remains;

generating a plurality of clusters within the defined geographic region using one or more metrics obtained from the second plurality of data sets;

for each cluster in the plurality of clusters, determining a solution type and a specific location within the cluster for deployment of the solution type; and ranking each cluster in the plurality of clusters relative to one another based on a precedence of the determined solution type for the cluster relative to the precedence of the solution type for other clusters of the plurality of clusters.

17. The system of claim 16, wherein the one or more processors are further configured to:

determining whether an active site can provide service coverage to an area within the defined geographic area corresponding to the cluster by modifying antenna tilt at the active site.

18. The system of claim 16, wherein the one or more processors are further configured to:

determining whether the active site can provide service coverage to an area within the defined geographic area corresponding to the cluster by utilizing a low band frequency at or below 1 GHz.

19. The system of claim 16, wherein the one or more processors are further configured to:

determining whether an active lease-agreement site can provide service coverage to an area within the defined geographic area corresponding to the cluster.

20. The system of claim 16, wherein the one or more processors are further configured to:

determining whether deployment of a new small cell can provide service coverage to an area within the defined geographic area corresponding to the cluster based on a predefined proximity threshold of the cluster relative to a fiber-optic network.

* * * * *